March 25, 1958        H. G. MOORE        2,827,977
DOOR INTERLOCK SHUNT CIRCUIT FOR RAILWAY VEHICLES
Filed Feb. 10, 1955
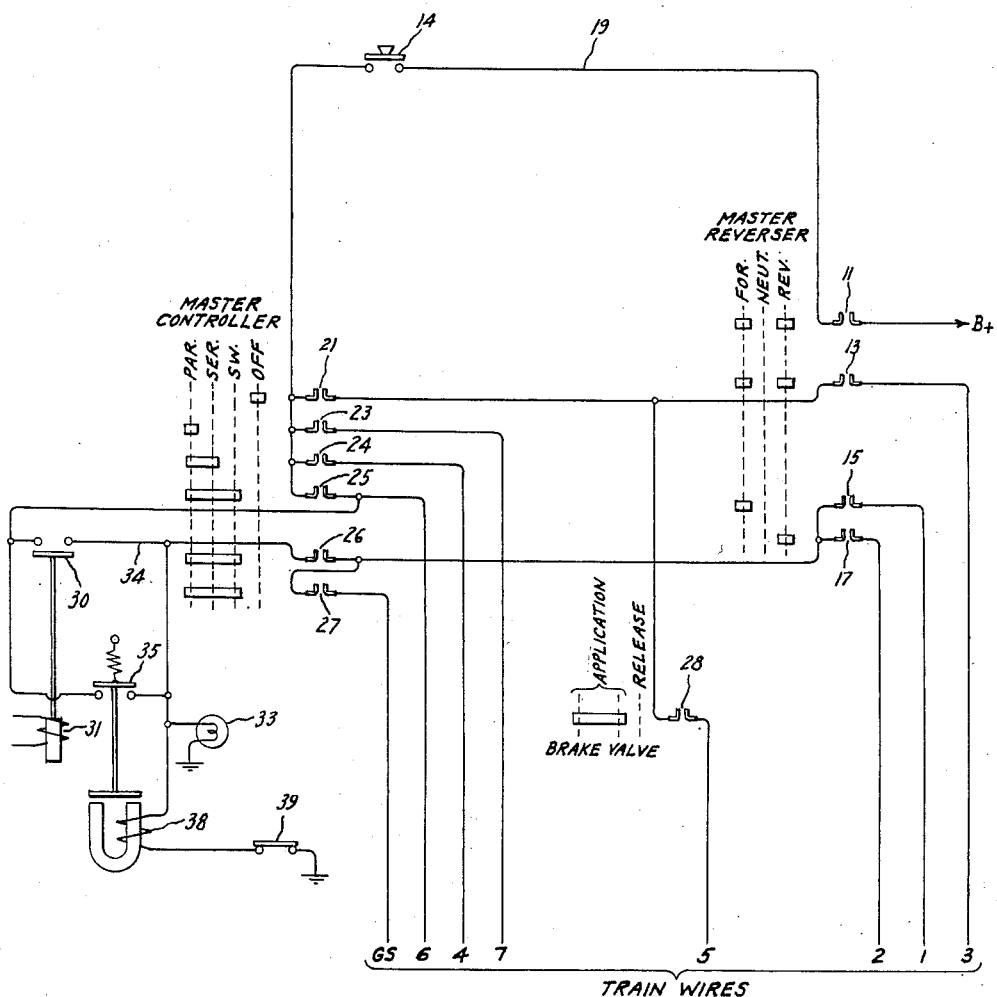
Inventor:
Harold G. Moore,
by Claude H. Mott
His Attorney.

United States Patent Office 2,827,977
Patented Mar. 25, 1958

2,827,977

DOOR INTERLOCK SHUNT CIRCUIT FOR RAILWAY VEHICLES

Harold G. Moore, Wesleyville, Pa., assignor to General Electric Company, a corporation of New York Application February 10, 1955, Serial No. 487,402

2 Claims. (Cl. 180—82)

My invention relates to apparatus for use in vehicles of the multiple-unit type where a plurality of vehicles are each self-powered and to a control system for energizing the train wires between these multiple-unit vehicles to facilitate the proper coordinated control of the self-powered units from one control position, and more particularly to means for nullification of the electric interlock between the door-control and the propulsion-control circuits.

Heretofore it has been known to connect several individually powered rail vehicles to form a train. The units are usually remotely controlled through the energization of several train wires which connect the several control units. As shown in the Letters Patent of the United States 2,566,898 of Ira W. Lichtenfels and myself issued September 4, 1951, and assigned to the assignee of the present application, the various functions of the individual units of the multiple-unit vehicles may be automatically controlled, i. e., accelerated in the series connection and in the parallel connection and dynamically braked automatically when the various train wires are energized. It is necessary to match these various equipments with all of the rail vehicles used in the particular run so that the engineman in the lead or control vehicle may readily control all of the vehicles.

To provide for safe operation, it is necessary that a door actuated relay prevent operation of the train when any of the doors of the train are not properly closed. When it is necessary to depend on the proper actuation of the various switches at each of the doors to insure operation of this door interlock relay, it often occurs that one of the switch mechanisms or some other part of the door interlock system will fail and prevent operation of this relay.

Therefore, it is the object of my invention to provide a simple and economical system for energizing the various train wires in a train to insure full control of the self-powered units regardless of whether the proper signal is received from the various door switches.

Further objects and advantages of this invention will become apparent and the invention will be better understood by reference to the following description and the accompanying drawing. The features of novelty which characterize this invention will be pointed out with particularity in the claims annexed to and forming a part of this specification.

In accordance with one form of my invention, the engineman applies power to selected train lines by positioning a master reverser to close contacts for driving the self-powered units in the forward or reverse direction. The master controller is then switched from the "off" position to the "switching" position to apply power to other selected train lines. If the engineman finds that the door interlock has not closed, he checks the various cars to be sure that they are not in a dangerous condition and then bypasses the door interlock by manually energizing the holding coil of a bypass relay and proceeds to accelerate the train by moving the master controller to the series position and then to the parallel position.

The single figure of this drawing illustrates the schematic circuit for energizing the train wires of this invention.

Referring now to Fig. 1, I have shown train wires 1, 2, 3, 4, 5, 6, 7 and GS which will be energized to put into operation automatic equipment for controlling each of the self-powered units of the train. The automatic equipment itself is not a portion of this invention and will not be fully explained. Suitable equipment for automatically accelerating and decelerating the self-powered units of this multiple-unit vehicle is shown in the aforementioned Letters Patent 2,566,898.

When the engineman is preparing to move the train forward, he moves the master reverser from the neutral position to the forward position closing the contactors 11, 13 and 15 but not closing the contactor 17. This energizes the power wire 19 from the battery or low voltage generator so that he may now apply power to the train line 3 by closing the control switch 14. Thus, power is applied from the power wire 19 through the closed contactor 21 of the master controller in the "off" position through the closed contactor 13 of the master reverser to the train wire 3.

It should be noted that an interlock usually is placed between the master reverser and the master controller to prevent movement of the master controller when the master reverser is in neutral and to prevent movement of the master reverser unless the master controller is in the "off" position. It should also be noted that the master reverser operating handle is removed in each of the trailing units, and that this handle can only be removed with the master reverser in the neutral position and of course the master controller in the "off" position because of the interlocking arrangement. In actual practice, all master reverser operating levers are removed when the train is stored and the engineman carries one to the vehicle he is to use as a control car. This practice assures the proper control of the multiple unit train from one control cab.

The train wire 5 may be energized by the application of the brake valve to close the contactor 28 when power is applied from the power line 19 through the contactor 21 of the master controller. In some equipments it is necessary to energize both wires 3 and 5 to control the braking of the vehicle. On other equipments the use of the train wire 5 is sufficient.

In the "off" position, the contactors 23, 24, 25, 26 and 27 of the master controller have not been closed so that power may not be applied to the train lines 1, 2, 4, 6, 7 or GS. When the master reverser is positioned properly and the master controller is moved from the "off" to the "switching" position, contactors 25, 26 and 27 are closed. This immediately applies power to the train line 6. However, the train lines 1, 2 and GS are not energized unless the relay contact 30 has been closed by the energization of the door interlock relay 31. The interlock relay 31 is connected to be energized when all of the doors in each of the train units have been closed.

The picking up of the train wire 6 closes connections in the motor circuits of the self-powered train units to prepare the motors for series operation with the maximum load impedance in the circuit to prevent excessive overcurrents in the motors.

The train wires 1 and 2 are utilized to connect the slave reverser switches in the various self-powered units to follow the positioning of the master reverser in the engineman's cab so that each of the units will provide tractive effort in the same direction. The train wire GS energizes contacts which ground the motor circuit of each of the self powered train units to allow the application of the power to the series connected motors. It is apparent that the motors cannot be accelerated without the energization of train wires GS and either 1 or 2.

The interlock relay 31 prevents energization of these train wires to prevent application of power to accelerate the traction equipment of the self-powered units until the door closing circuits provide the proper signal. Whenever there is a fault in the train which applies emergency brakes, the interlock relay 31 is disconnected to de-energize these wires and disconnect the motors from ground.

When the engineman has moved the master controller to the switching position and finds that the indicating lamp 33 has not been energized, he is put on notice that the power line 34 is not energized, the train lines 1, 2 and GS are not energized, and the train cannot be accelerated. If upon checking the units he finds that the doors are actually properly closed, he energizes a momentary contact bypass switch means 35 to bypass the door interlock relay 31. This energizes the power wire 34 and applies power to the train lines 1 or 2 and GS to allow acceleration of the train.

When the power has been applied to the power wire 34, the indicator 33 will be connected and the momentary switch 35 will be held closed by the energization of a holding winding 38 which engages an armature secured mechanically to the switch 35 as shown. The holding winding 38 frees the engineman from manually holding the momentary switch 35 closed. He may safely and properly operate the train. In order that the holding coil 38 is de-energized upon the opening of the contactor 25 of the master controller, it is connected to be energized from the train wire 6 and remains energized until the master controller is returned to the "off" position which opens the contactor 25. However, the holding winding 38 is not designed to provide a sufficient force to close the switch 35. Even if it is found that the train has doors which are not operating properly, it is essential to be able to move the train to a point of safety from the main line of the track. Again it would be unsafe to require the engineman to maintain manually the switch 35 in the closed position. The contact 39 is connected to be opened by the application of the emergency brakes so that even with the use of the momentary bypass switch 35, the application of emergency brakes will disconnect the motors from ground by opening the train line GS.

To accelerate the train after power has been applied to the power wire 34 in the switching position of the master controller, the engineman merely moves the master controller into "series" position to energize train wire 4 through the contactor 24. The energization of the train wire 4 completes the connections necessary to accelerate the traction equipments in each of the self-powered units of the train in the series connections. The actual acceleration of the units is automatic when the train wire 4 has been energized. The engineman is free to move the master controller to the "parallel" position at any time to further accelerate the train. The actual means for controlling the maximum series and the maximum parallel speeds are not a part of this invention and will not be discussed. However, a suitable system is fully explained in the aforementioned Patent 2,566,898. Returning the master controller to the "off" position de-energizes the train wires 1, 2, 4, 6, 7 and GS to disconnect the traction motors from the power source and from ground. This automatically establishes the braking connections of the traction motors with the motors coasting at a very low value of motor current. The closing of the brake valve then energizes the train wire 5 to connect the motors for dynamic braking for stopping the train. Returning the master controller to the "off" position also opens the bypass switch 35 by de-energizing the holding winding 38.

In summary, I have developed a safe and reliable system for energizing the proper train wires to prepare the train for acceleration regardless of a fault in the door interlock relay 31 or its associated circuitry.

While I have shown particular embodiments of my invention, it will be understood, of course, that I do not wish to be limited thereto since many modifications may be made, and I intend by the appended claims to cover any such modifications as fall within the true spirit and scope of my invention.

What I claim as new and desire to secure by Letters Patent of the United States is:

1. A system for selectively energizing train wires to control a train having a plurality of self-powered automatically accelerated units comprising a master reverser for selectively energizing train wires to control slave reversers in the self-powered units to determine the direction of acceleration of each of the units, a master controller for selectively energizing train wires to accelerate the self-powered units, door interlock relay contacts connected in circuit with a contactor of said master controller for preventing application of power to the self-powered units when the door closing circuits of the self-powered units do not operate properly or when emergency brakes are applied, momentary switch means connected in circuit with said contactor for bypassing said door interlock relay contacts to allow acceleration of the self-powered units when said door interlock relay fails to operate, a holding winding connected to be energized through a contact of said master controller and energize an armature mechanically secured to said momentary switch means for maintaining said momentary switch means in the closed position whereby the train may be safely operated without manually maintaining said switch means closed, and a contact serially connected in circuit with said holding winding for de-energizing said holding winding when emergency brakes are applied.

2. A door interlock shunt circuit for selectively energizing train wires to control a train having a plurality of self-powered automatically accelerated units comprising a master reverser for selectively energizing train wires to control slave reversers in the self-powered units to determine the direction of acceleration of each of the units, a master controller for selectively energizing train wires to accelerate the self-powered units, door interlock relay contacts connected in circuit with a contactor of said master controller for preventing application of power to the self-powered units when the door closing circuits of the self-powered units do not operate properly or when emergency brakes are applied, momentary switch means connected in circuit with said contactor for bypassing said door interlock relay contacts to allow acceleration of the self-powered units when said door interlock relay fails to operate, a holding winding connected to be energized through said contactor of said master controller and said momentary switch for maintaining said switch means in the closed position whereby the train may be safely operated without manually maintaining said switch means closed, said holding winding being designed to provide less magnetic attraction than would be required to close said momentary switch, a contact connected in circuit with said holding winding for de-energizing said holding winding when emergency brakes are applied, and an indicator lamp connected in circuit with said relay contacts and said momentary switch means for providing a signal when either said contacts or said means establish a current carrying circuit.

References Cited in the file of this patent

UNITED STATES PATENTS

| | | |
|---|---|---|
| 945,964 | Lincoln | Jan. 11, 1910 |
| 1,077,818 | Eagar | Nov. 4, 1913 |
| 1,182,546 | Fischer et al. | May 9, 1916 |
| 2,461,265 | Gates | Feb. 8, 1949 |
| 2,637,009 | Drake | Apr. 28, 1953 |